US011110357B2

(12) United States Patent
Yokozawa et al.

(10) Patent No.: US 11,110,357 B2
(45) Date of Patent: Sep. 7, 2021

(54) VIDEO GAME PROCESSING PROGRAM, AND VIDEO GAME PROCESSING SYSTEM

(71) Applicant: KABUSHIKI KAISHA SQUARE ENIX, Tokyo (JP)

(72) Inventors: Tsuyoshi Yokozawa, Tokyo (JP); Shingo Tate, Shinjuku-ku (JP)

(73) Assignee: KABUSHIKI KAISHA SQUARE ENIX, Tokyo (JP)

(*) Notice: Subject to any disclaimer, the term of this patent is extended or adjusted under 35 U.S.C. 154(b) by 0 days.

(21) Appl. No.: 16/544,387

(22) Filed: Aug. 19, 2019

(65) Prior Publication Data
US 2019/0366219 A1 Dec. 5, 2019

Related U.S. Application Data

(63) Continuation of application No. 15/584,442, filed on May 2, 2017, now Pat. No. 10,427,052.

(30) Foreign Application Priority Data

May 9, 2016 (JP) ................................ 2016-093656

(51) Int. Cl.
A63F 13/822 (2014.01)
A63F 13/67 (2014.01)
(Continued)

(52) U.S. Cl.
CPC ............ *A63F 13/822* (2014.09); *A63F 13/35* (2014.09); *A63F 13/58* (2014.09); *A63F 13/67* (2014.09)

(58) Field of Classification Search
CPC .......... A63F 13/45; A63F 13/46; A63F 13/55; A63F 13/58; A63F 13/822; A63F 2300/558; A63F 2300/63; A63F 2300/807
See application file for complete search history.

(56) References Cited

U.S. PATENT DOCUMENTS

2005/0170888 A1 8/2005 Sakamoto

FOREIGN PATENT DOCUMENTS

JP 2002-292140 10/2002
JP 2002-306851 10/2002
(Continued)

OTHER PUBLICATIONS

"Sekaiju and the Mysterious Dungeon," accessible Apr. 3, 2015 via Archive.org. Source: https://web.archive.org/web/20150403045745/http://ds-can.com/sfd/ (Year: 2015).*

(Continued)

Primary Examiner — Steven J Hylinski
(74) Attorney, Agent, or Firm — Greenblum & Bernstein, P.L.C.

(57) ABSTRACT

A non-transitory computer-readable medium including a video game processing program product for causing a server to realize functions to control progress of a video game in response to an operation of a user is provided. The functions include: an event participation managing function configured to receive participation in an event from at least one of users; an initial level setting function configured to set a level of a player character in the event to a predetermined initial level regardless of a level thereof indicating a degree of strength outside the event of the player character, and to cause the event to start after setting; a level-up determining function configured to manage a predetermined condition to raise the level of the player character in the event; and a privilege giving function configured to give a privilege in the event to the player character or the user.

15 Claims, 8 Drawing Sheets

(51) Int. Cl.
*A63F 13/35* (2014.01)
*A63F 13/58* (2014.01)

(56) References Cited

FOREIGN PATENT DOCUMENTS

| | | |
|---|---|---|
| JP | 2011-182895 A | 9/2011 |
| JP | 2014-158938 | 9/2014 |
| JP | 2015-002967 | 1/2015 |
| JP | 5873943 | 1/2016 |
| WO | 2013/111245 | 8/2013 |

OTHER PUBLICATIONS

"Fair Arena," from DFO World Wiki. Published Sep. 17, 2012. Source: https://web.archive.org/web/20150218182657/https://wiki.dfo-world.com/view/Fair_Arena (Year: 2012).*

"A Beginner/ General Guide to Dfo," by JustinYummy, published May 21, 2014. Source: https://forums.d2jsp.org/topic.php?t=70771988 (Year: 2014).*

"Dungeon Fighter Online," Accessed Mar. 22, 2015. Source: https://web.archive.org/web/20150322182830/https://mmos.com/review/dungeon-fighter-online (Year: 2015).*

"DFO Beginner's Guide," Published Dec. 12, 2013. Source: https://web.archive.org/web/20140901210037/https://guidescroll.com/2013/12/dfo-beginners-guide/ (Year: 2013).*

"Any MMO with "Fair" PvP aside from GW?" by RollieJoe, published Mar. 2015. Source: https://forums.mmorpg.com/discussion/428719/any-mmo-with-fair-pvp-aside-from-gw (Year: 2015).*

"Kouryaku-kinsho vol. 7", Sansai-Mook vol. 840 dated Dec. 15, 2015 (relevancy provided in the below noted English translation of Japanese Office Action dated Jan. 28, 2020 issued in Japanese patent application No. 2018-074843).

Japanese Office Action dated Jan. 28, 2020 issued in Japanese patent application No. 2018-074843 with English translation.

Office Action issued in Japan Patent Appl. No. JP 2016-093656 dated Jun. 20, 2017, along with an English translation thereof.

"Mystery Dungeon—Level Reset Dungeon", Can of Winning Etrian Mystery Dungeon, dated Apr. 12, 2016 (https://web.archive.org/web/20160412210826/http://ds-can.com/sfd/story/ex-fusigi.html).

"Final Fantasy XIV: A Realm Reborn", Monthly Famitsu Connect! On, vol. 5, No. 6, dated Apr. 27, 2015, Kadokawa Dwango Corporation, p. 31.

"Starting Now Puzzle & Dragons, A Limit and Rule of Special Dungeon" Jidaraku 1000 Combo, dated Nov. 12, 2015, pd1000 (http://pd1000.hatenablog.com/entry/20 15/11/12/042 551.

"Ability of God and Angels", The Guided Fate Paradox—The Complete Guide, dated Mar. 15, 2013, ASCII Media Works Inc., pp. 023-024.

"Unlosing Ranger", Z.H.P.TM: Unlosing Ranger vs Darkdeath Evilman—The Complete Guide, dated Apr. 2, 2010, ASCII Media Works Inc., 1$^{st}$ vol., pp. 006-008.

Japanese Office Action issued for Japanese Patent Application No. 2016-093656 dated Jan. 9, 2018 along with an English translation thereof.

"Shiren the Wanderer" The first full-scale "cooperation play" of the series became possible in multiplay, 4Gamer.net, http://www.4gamer.net/games/119/G011901/2010, Nov. 16, 2010.

Updated English description (dated Apr. 16, 2019) of "Mystery Dungeon—Level Reset Dungeon", Can of Winning Etrian Mystery Dungeon (https://web.archive.org/web/20160412210826/http://ds-can.com/sfd/story/ex-fusigi.html).

Updated English description (dated Apr. 16, 2019) of "Shiren the Wanderer" The first full-scale "cooperation play" of the series became possible in multiplay, 4Gamer.net, http://www.4gamer.net/games/119/G011901/2010.

Japanese Office Action dated Apr. 16, 2019 issued in Japanese Patent Application No. 2018-074843, along with a corresponding English translation.

Japanese Office Action dated Jun. 23, 2020 issued in Japanese Patent Application No. 2018-074843, along with corresponding English translation.

Dragon Quest 10 PART888(Mysterious magic tower first time • 1-5 layers) YouTube[online] [video],Sep. 8, 2015, mainly refer to 0:10,3:44-4:05 [searched on Jun. 12, 2020 ],URL, https://www.youtube.com/watch?v=fNPm72sJhpY (discussed in the Japanese Office Action dated Jun. 23, 2020 issued in Japanese Patent Application No. 2018-074843 noted above).

* cited by examiner

VIDEO GAME PROCESSING PROGRAM, AND VIDEO GAME PROCESSING SYSTEM

CROSS-REFERENCE TO RELATED APPLICATIONS

This application is a Continuation of U.S. patent application Ser. No. 15/584,442, filed on May 2, 2017, which in turn claims the benefit of Japanese Application No. 2016-093656 filed on May 9, 2016, the entire disclosures of which Applications are incorporated by reference herein. The present application relates to subject matter contained in Japanese Patent Application No. 2015-250379 filed on May 9 2016, the disclosure of which is expressly incorporated herein by reference in its entirety.

BACKGROUND OF THE INVENTION

1. Field of the Invention

At least one of embodiments according to the present invention relates to a non-transitory computer-readable medium including a video game processing program and a video game processing system for causing a server to realize functions to control progress of a video game in response to an operation of a user.

2. Description of the Related Art

Recently, a so-called MMORPG (Massively Multiplayer Online Role-Playing Game) is becoming widespread. In the MMORPG, many users causes their user terminals to connect to a game server via a communication line, whereby the users can enjoy a role-playing game within a virtual space that is set up in the game server.

In such an MMORPG, a level indicating strength in a video game is set to a player character. The higher the level of the player character becomes, the higher numerical values of various kinds of parameters indicating strength of the player character becomes. Further, the number of skills that can be used by the player character (such as special abilities each of which can be used during a battle against an enemy character or during movement in a field, by which the user can cause the video game to proceed advantageously) is thereby increased.

As an MMORPG in which ingenuity for a user not to lose the desire to participate in a video game even though there is a difference between learning levels of player characters is exercised, there is Japanese Patent Application Publication No. 2015-002967 (hereinafter, referred to as "Patent Document 1"), for example.

In the Patent Document 1, representation processing, in which a difference between parameters of two characters that belong to the same group and whose attacking turns are consecutive numbers is computed and an attack effect exerted by the group is increased in accordance with the difference of the parameters, is carried out, whereby it is possible to prevent a user from losing the desire to participate in the video game even though there is a difference between learning levels of users. However, in a case where there is an extreme difference between the levels of the player characters, a player character with a low level becomes an action impossible state easily and immediately by an attach from an enemy character when to participate in an event or a dungeon that is suitable for a player character with a high level. For this reason, there has been a fear that it is impossible to make use of this system.

The level of the player character is in proportion to a play time of a video game of the user to a certain degree. For this reason, a difference between the levels of the users is generated. Further, a user, who starts the video game later than other users, starts to play the video game far behind the other users. Thus, a difference between the levels of the player characters becomes larger. In a case where the difference becomes larger in this manner, a merit to form a party together with the player of the player character with the low level is reduced with respect to the player of the player character with the high level. Therefore, there has been a problem that the player of the player character with the low level hardly forms a party and the desire of such a player to participate in the video game is thus lowered.

SUMMARY OF THE INVENTION

It is an object of at least one of embodiments according to the present invention to solve the problem described above, and to provide a non-transitory computer-readable medium including a video game processing program product in which even though there is a difference between levels of two player characters, the two player characters are allowed to form a party (or a group) and to enjoy a video game at the same time.

According to one non-limiting aspect of the present invention, there is provided a non-transitory computer-readable medium including a video game processing program product for causing a server to realize functions to control progress of a video game in response to an operation of a user.

The functions include an event participation managing function configured to receive participation in an event from at least one of users in the video game to constitute and manage a party, the at least one of the users being allowed to participate in the event.

The functions also include an initial level setting function configured to set a level of a player character in the event to a predetermined initial level regardless of a level of the player character indicating a degree of strength outside the event of the player character of the user who participates in the event, the initial level setting function being configured to cause the event to start after the level of the player character in the event is set to the predetermined initial level.

The functions also include a level-up determining function configured to manage a predetermined condition to raise the level of the player character in the event, the level-up determining function being configured to determine whether the player character satisfies the predetermined condition or not.

The functions also include a privilege giving function configured to give a privilege in the event to the player character or the user in a case where the level of the player character in the event reaches a predetermined level, the predetermined level being a level that the player character has already reached out of the event.

According to another non-limiting aspect of the present invention, there is provided a non-transitory computer-readable medium including a video game processing program for causing a user terminal to realize functions to control progress of a video game in response to an operation of a user.

The functions include an event participation managing function configured to receive participation from at least one of users in an event in the video game to constitute and manage a party, the at least one of the users being allowed to participate in the event.

The functions also include an initial level setting function configured to set a level of a player character in the event to a predetermined initial level regardless of a level of the player character indicating a degree of strength outside the event of the player character of the user who participates in the event, the initial level setting function being configured to cause the event to start after the level of the player character in the event is set to the predetermined initial level.

The functions also include a level-up determining function configured to manage a predetermined condition to raise the level of the player character in the event, the level-up determining function being configured to determine whether the player character satisfies the predetermined condition or not.

The functions also include a privilege giving function configured to give a privilege in the event to the player character or the user in a case where the level of the player character in the event reaches a predetermined level, the predetermined level being a level that the player character has already reached out of the event.

According to still another non-limiting aspect of the present invention, there is provided a video game processing system for controlling progress of a video game in response to an operation of a user, the video game processing system including a communication network, a server, and a user terminal.

The video game processing system includes an event participation managing section configured to receive participation in an event from at least one of users in the video game to constitute and manage a party, the at least one of the users being allowed to participate in the event.

The video game processing system also includes an initial level setting section configured to set a level of a player character in the event to a predetermined initial level regardless of a level of the player character indicating a degree of strength outside the event of the player character of the user who participates in the event, the initial level setting function being configured to cause the event to start after the level of the player character in the event is set to the predetermined initial level.

The video game processing system also includes a level-up determining section configured to manage a predetermined condition to raise the level of the player character in the event, the level-up determining function being configured to determine whether the player character satisfies the predetermined condition or not.

The video game processing system also includes a privilege giving section configured to give a privilege in the event to the player character or the user in a case where the level of the player character in the event reaches a predetermined level, the predetermined level being a level that the player character has already reached out of the event.

According to each of the embodiments of the present application, one or two or more shortages are solved.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Hereinafter, examples of embodiments according to the present invention will be described with reference to the drawings. In this regard, various kinds of elements in an example of each embodiment, which will be described below, can appropriately be combined with each other in a range where contradiction or the like did not occur. Further, explanation of the content that will be described as an example of an embodiment may be omitted in another embodiment. Further, the content of operations and/or processing with no relationship to characteristic portions of each embodiment may be omitted. Moreover, various kinds of processing that constitute various kinds of processing flows (will be described below) may be carried out in random order in a range where contradiction or the like did not occur in the content of the processing.

First Embodiment

Figure 1:
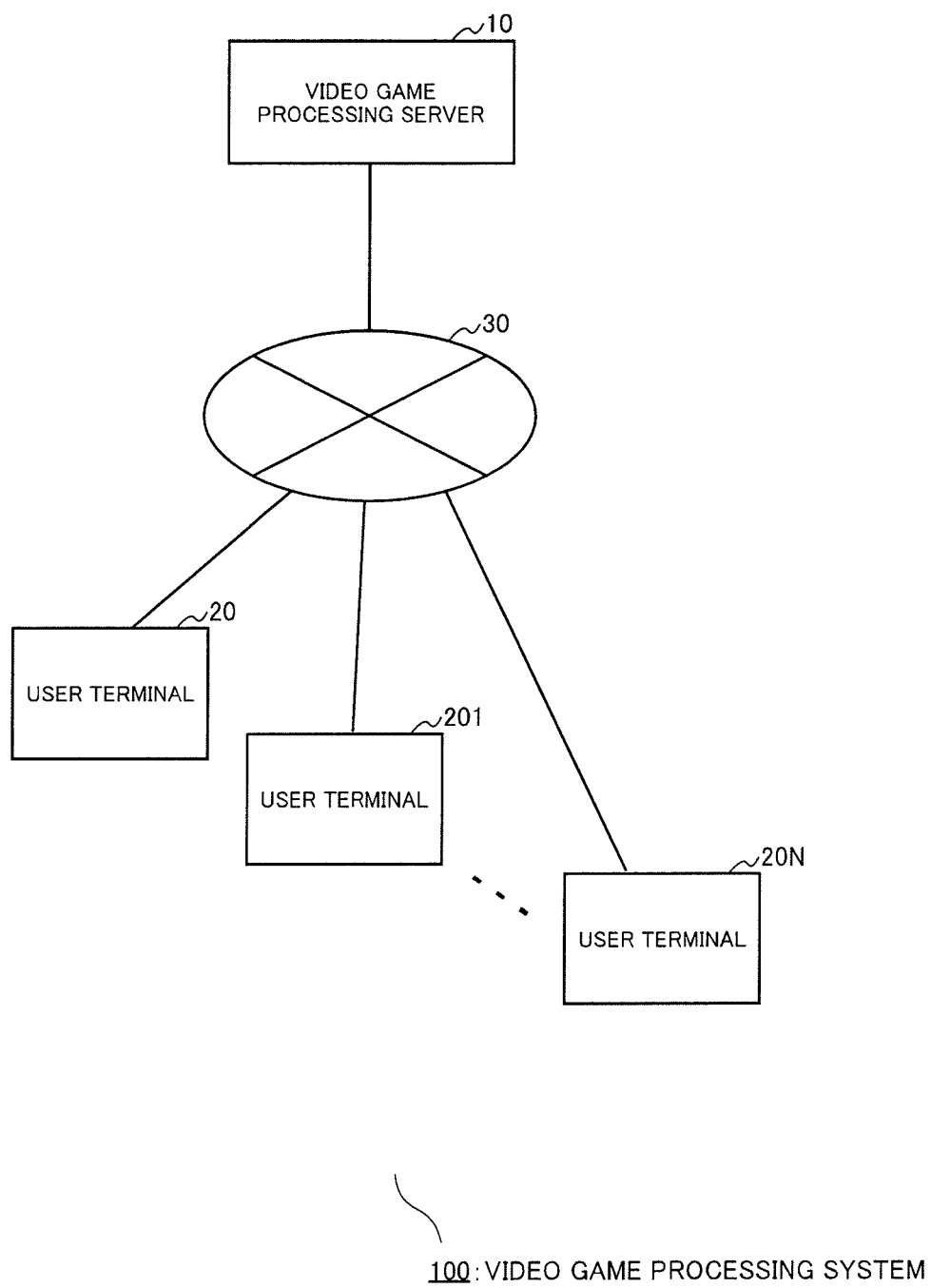
FIG. 1 is a block diagram showing an example of a configuration of a video game processing system corresponding to at least one of embodiments according to the present invention.

FIG. 1 is a block diagram showing an example of a configuration of a video game processing system 100 according to one embodiment of the present invention. As shown in FIG. 1, the video game processing system 100 includes a video game processing server 10 (hereinafter, referred to as a "server 10") and user terminals 20 and 201 to 20N ("N" is an arbitrary integer) respectively used by users of the video game processing system 100. In this regard, the configuration of the video game processing system 100 is not limited to this configuration. The video game processing system 100 may be configured so that the plurality of users uses a single user terminal, or may be configured so as to include a plurality of servers.

Each of the server 10 and the plurality of user terminals 20 and 201 to 20N is connected to a communication network 30 such as the Internet. In this regard, although it is not shown in the drawings, the plurality of user terminals 20 and 201 to 20N is connected to the communication network 30 by carrying out data communication with base stations managed by a telecommunication carrier by means of a radio communication line.

The video game processing system 100 includes the server 10 and the plurality of user terminals 20 and 201 to 20N, whereby various kinds of functions for carrying out various kinds of processing in response to an operation of the user is realized.

The server 10 is managed by an administrator of the video game processing system 100, and has various kinds of functions to provide information regarding various kinds of processing to the plurality of user terminals 20 and 201 to 20N. In the present embodiment, the server 10 is constructed by an information processing apparatus, such as a WWW server, and includes a storage medium for storing various kinds of information. In this regard, the server 10 is provided with a general configuration for carrying out the various kinds of processing as a computer, such as a control section and a communicating section. However, its explanation herein is omitted. Further, in the video game processing system 100, it is preferable that the server 10 manages various kinds of information from a point of view to reduce a processing load on each of the plurality of user terminals 20 and 201 to 20N. However, a storing section for storing various kinds of information may include a storage region in a state that the server 10 can access the storage region. For example, the server 10 may be configured so as to be provided with a dedicated storage region outside the server 10.

Figure 2:
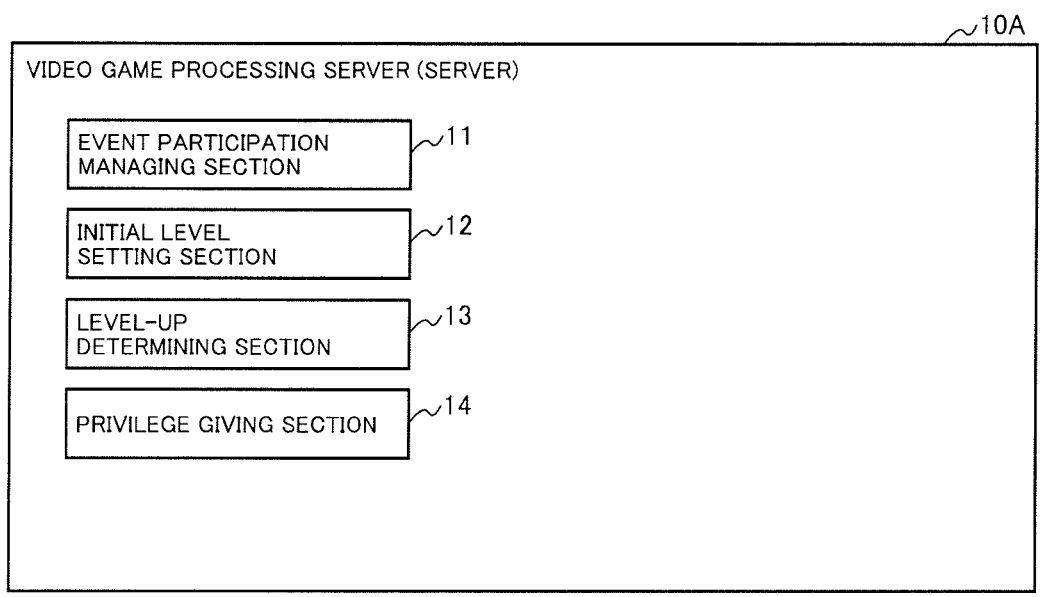
FIG. 2 is a block diagram showing a configuration of a video game processing server corresponding to at least one of the embodiments according to the present invention.

FIG. 2 is a block diagram showing a configuration of a video game processing server 10A (hereinafter, referred to as a "server 10A"), which is an example of the configuration of the server 10. As shown in FIG. 2, the server 10A at least includes an event participation managing section 11, an initial level setting section 12, a level-up determining section 13, and a privilege giving section 14.

The event participation managing section 11 has a function to receive participation in an event from each of a plurality of users in a video game that is realized by the video game processing system 100, and a function to constitute a party, which includes at least one of users each of whose participation is received, to manage the party.

The event mentioned herein means an event that is caused to start after levels of player characters that participate in the event are evenly set to a predetermined initial level regardless of a level of each of the player characters when to play the video game out of the event. Further, the word "out of the event" means the whole video game except for the event, in which the user plays using the player character thereof.

Further, the word "receive participation in an event" includes not only the case where the user hopes to participate in the event of user's own will but also a situation that the user is caused to forcibly participate in the event. When a certain event participation flag is on in this manner, reception of participation is carried out. In this regard, it is determined whether or not the event participation flag is established in an input operation carried out by the user.

The initial level setting section 12 has a function to carry out a process to set the level of the player character to a predetermined initial level at the time of start of the event. It is thought that the initial level is set to "Level 1", for example. In this case, although the level of the player character in the event is set to the predetermined initial level in the event, the level of the player character returns to an original level thereof when the event is terminated and the player character returns the outside of the event. For this reason, the setting to the initial level mentioned herein is a process limited in the event.

The level-up determining section 13 has a function to carry out determination of whether the level of the player character is to be raised or not on the basis of a point for raising the level, which is obtained in a case where a predetermined condition is satisfied in the event. As one example, it is thought that the level is to be raised on the basis of a so-called experience value, which is a point that the player character obtains when to win a battle against an enemy character.

The privilege giving section 14 has a function to give a privilege to the player character in the event in a case where the level of the player character in the event reaches a predetermined level, which is a level that the player character has already reached out of the event. For example, in a case where the level-up determining section 13 determines that the level of the player character is raised, the privilege giving section 14 determines whether the level is a predetermined level or not. The predetermined level is a level that the player character has already reached. The predetermined level mentioned herein means a level at which it is defined in advance to give a privilege to the user or the player character.

As examples of the privilege, there are various privilege such as learning of a special skill that cannot be learned by merely raising the level of the player character, giving of an item that can be used in an event, and giving of a currency that can be used in the video game, for example.

Each of the plurality of user terminals 20, 201 to 20N is managed by a user, and is configured by a communication terminal, such as a cellular phone terminal, a PDA (Personal Digital Assistants), a mobile game device, and a so-called wearable divide, by which the user can play a network delivery type game, for example. In this regard, a configuration of the user terminal that the video game processing system 100 can include is not limited to the examples described above. It may be a configuration in which the user can recognize the video game. As other examples of the user terminal, there is a combination of a so-called wearable device, such as a smart watch, and a communication terminal or the like configured to communicate with the wearable device.

Further, each of the plurality of user terminals 20, 201 to 20N is connected to the communication network 30, and includes hardware (for example, a display device for displaying a browser screen and a game screen according to a coordinate and the like) and software for carrying out various kinds of processing by communicating with the server 10. In this regard, each of the plurality of user terminals 20, 201 to 20N may be configured so as to be capable of directly communicating with each other without the server 10.

Next, an operation of the video game processing system 100 according to the present embodiment will be described.

Figure 3:
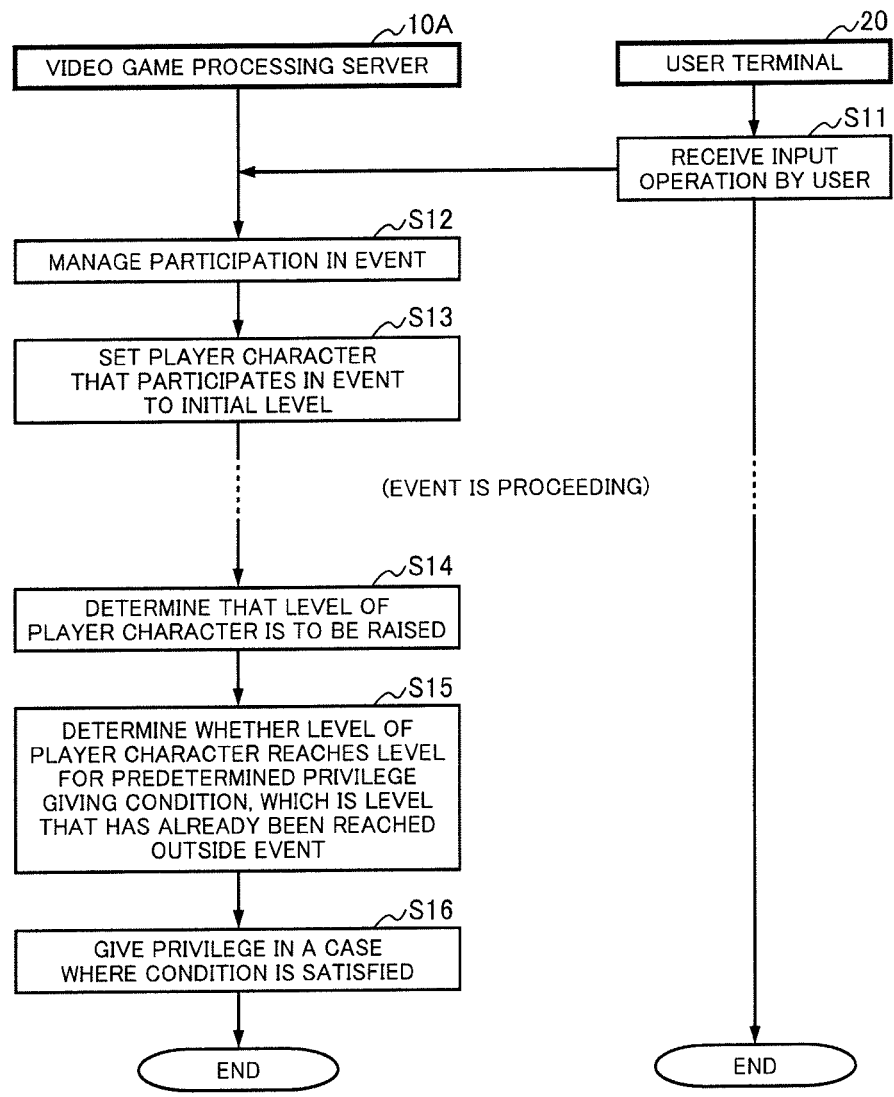
FIG. 3 is a flowchart showing an example of game processing corresponding to at least one of the embodiments according to the present invention.

FIG. 3 is a flowchart showing an example of game processing carried out by the video game processing system 100 (hereinafter, referred to as the "system 100"). In the game processing according to the present embodiment, processing related to registration of an event is carried out. Hereinafter, the case where the server 10A and the user terminal 20 (hereinafter, referred to also as a "terminal 20") carry out the game processing will be described as an example.

When an event participation flag is set to on by means of an input operation carried out by the user in the user terminal 20, the event participation flag is transmitted from the user terminal 20 to the server 10A (Step S11). For example, the game processing is started from the time when the server 10A receives the event participation flag.

When the server 10A receives the event participation flag, the event participation managing section 11 manages participation of a party in the event (Step S12). The party is constituted by at least one player character that participates in the event. Then, the initial level setting section 12 evenly sets the levels of all of the player characters, which are members of the constituted party, to the predetermined initial level regardless of the levels of the player characters out of the event, and causes the event to start (Step S13).

When the event is proceeding, the level-up determining section 13 determines whether the level of the player character is to be raised or not on the basis of the point for raising the level thereof. The point is obtained in a case where a predetermined condition is satisfied in the event. In a case where the predetermined condition is satisfied, the level-up determining section 13 determines that the level of the player character is to be raised (Step S14).

In a case where the level of the player character is raised, the level-up determining section 13 determines whether the level of the player character reaches a predetermined level as a condition to give a privilege to the player character, or not (Step S15). In this case, the predetermined level is a level that the player character has already reached out of the event. In a case where this condition is satisfied, the privilege giving section 14 gives the privilege to the player character (Step S16). In this regard, the subject to which the privilege is given may be the player character or the user. Alternatively, the system 100 may be configured so that the privilege is given to other player character that participates in the party or other user thereof.

Figure 4:
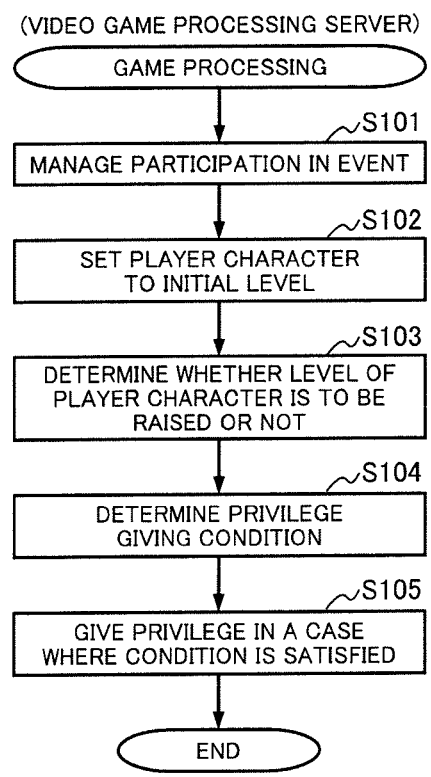
FIG. 4 is a flowchart showing an example of an operation of a server side in the game processing corresponding to at least one of the embodiments according to the present invention.

FIG. 4 is a flowchart showing an example of an operation of the server 10A side in the game processing. Here, an operation of the server 10A in the video game processing system 100 will be described.

The server 10A starts the game processing at the time when the event participation flag is satisfied. In the game processing, the event participation managing section 11 manages participation of a party, in which at least one player character that participates in an event, in the event (Step S101). The initial level setting section 12 then sets a level of each of all party members to a predetermined initial level to start the event (Step S102). The player character obtains the point for raising the level thereof in association with progress of the event. For this reason, the level-up determining section 13 determines whether the level of the player character is raised or not when to obtain the point (Step S103). In a case where it is determined that the level of the player character is raised, the privilege giving section 14 further determines whether the level of the player character reaches a predetermined level or not (Step S104). The predetermined level is used as a condition to give a privilege, and is the level that the player character has already reached out of the event. In a case where the condition to give the privilege is satisfied, the privilege giving section 14 gives the privilege to the player character (Step S105).

Figure 5:
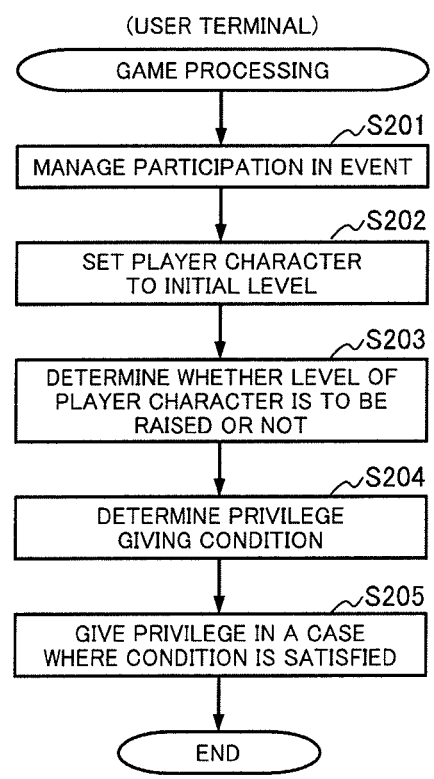
FIG. 5 is a flowchart showing an example of an operation of a user terminal side in the game processing corresponding to at least one of the embodiments according to the present invention.

FIG. 5 is a flowchart showing an example of an operation of the user terminal 20 side in a case where the user terminal 20 carries out the game processing. Hereinafter, the case where the user terminal 20 carries out the game processing by a single body will be described as an example. In this regard, the configuration of the user terminal 20 includes the similar functions to those of the server 10 except that the user terminal receives various kinds of information from the server 10. For this reason, its description is omitted from a point of view to avoid repeated explanation.

The user terminal 20 starts the game processing at the time when the event participation flag is satisfied. In the game processing, the user terminal 20 manages participation of a party, in which at least one player character that participates in an event, in the event (Step S201). The user terminal 20 then sets a level of each of all party members to a predetermined initial level to start the event (Step S202). The player character obtains the point for raising the level thereof in association with progress of the event. For this reason, the user terminal 20 determines whether the level of the player character is raised or not when to obtain the point (Step S203). In a case where it is determined that the level of the player character is raised, the user terminal 20 further determines whether the level of the player character reaches a predetermined level or not (Step S204). The predetermined level is used as a condition to give a privilege, and is the level that the player character has already reached out of the event. In a case where the condition to give the privilege is satisfied, the user terminal 20 gives the privilege to the player character (Step S205).

As explained above, as one side of the first embodiment, the server 10A provided with the functions to control progress of the video game in response to an operation of the user is configured so as to include the event participation managing section 11, the initial level setting section 12, the level-up determining section 13, and the privilege giving section 14. Thus, the event participation managing section 11 receives participation in the event in the video game, in which at least one user is allowed to participate; the event participation managing section 11 constitutes a party, which includes at least one of users each of whose participation is received, to manage the party; the initial level setting section 12 sets the level of the player character in the event to the predetermined initial level regardless of the level of the player character indicating a degree of strength outside the event of the player character of the user who participates in the event, and causes the event to start after the setting; the level-up determining section 13 manages a predetermined condition to raise the level of the player character in the event, and determines whether the player character satisfies the predetermined condition or not; and the privilege giving section 14 gives a privilege to the player character in the event in a case where the level of the player character in the event reaches a predetermined level, which is a level that the player character has already reached out of the event. Therefore, it is possible to form a party from two or more player characters and enjoy the video game at the same time even though there is a difference among levels of the two or more player characters.

Namely, even though a player character with a low level and a player character with a high level are mixed in a party, it is possible for users associated with the player characters to enjoy the event together by always setting levels thereof in the event to the same initial level and causing the event to start. Further, in case of the player character with the high level, the player character is allowed to obtain a privilege when a level of the player character in the event reaches a level that the player character has already reached out of the event, which is the condition to give the privilege to the player character. For this reason, a user who operates a player character with a high level benefits from such a configuration. In addition, there is an effect to further attract interest of the user in the video game depending upon the content of the privilege.

Second Embodiment

Figure 6:
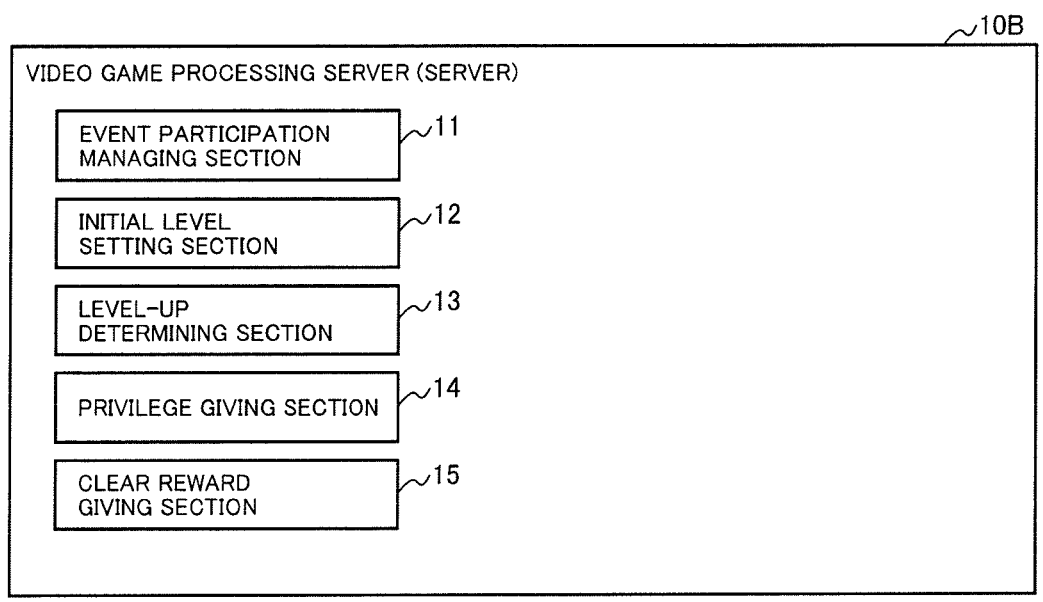
FIG. 6 is a block diagram showing a configuration of the server corresponding to at least one of the embodiments according to the present invention.

FIG. 6 is a block diagram showing a configuration of a video game processing server 10B (hereinafter, referred to as a "server 10B"), which is an example of the configuration of the server 10. As shown in FIG. 6, the server 10B at least includes an event participation managing section 11, an initial level setting section 12, a level-up determining section 13, a privilege giving section 14, and a clear reward giving section 15.

The clear reward giving section 15 has a function to give a clear reward to a player character that participates in an event in a case where a predetermined condition to clear the event is satisfied. The predetermined condition is set to the event. As examples of the predetermined condition to clear the event, there are a condition that the player character defeats a specific boss character, a condition that the player character reaches a specific floor in an event in which the player character goes underground, and the like, for example.

As an example of the clear reward, there is a case where a point for raising a level of a player character out of an event, that is, a so-called experience value is given to the player character, which participates in the event, of a user for which a level of the player character out of an event does not reach an upper limit. On the other hand, it is no need to give the experience value to a user for which a level of the player character out of the event has already reached the upper limit. For this reason, an item that can be used in the video game may be given to such a user. Alternatively, various kinds of clear rewards can be thought.

Figure 7:
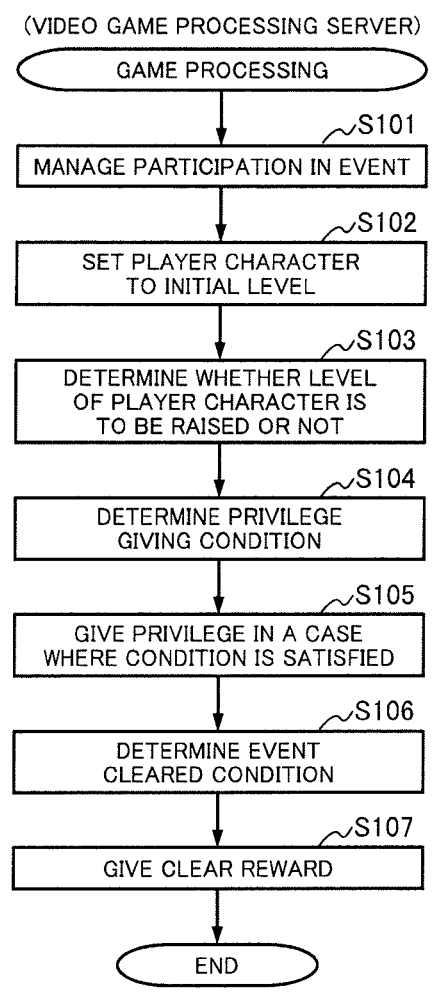
FIG. 7 is a flowchart showing an example of an operation of a server side in the game processing corresponding to at least one of the embodiments according to the present invention.

FIG. 7 is a flowchart showing an example of an operation of the server 10B in the game processing. Here, an operation of the server 10B in the video game processing system 100 will be described.

When the event is proceeding, the server 10B determines whether an event cleared condition is satisfied or not (Step S106). When the event cleared condition is satisfied, the event is terminated. At this time, the clear reward giving section 15 gives a reward obtained by clearing the event to the player character (Step S107). Then, the server 20B transmits the given reward obtained by clearing the event to the user terminal 20, and the user terminal 20 carries out a process to display a game screen on the basis of the reward.

As explained above, as one side of the second embodiment, the server 10B provided with the functions to control progress of the video game in response to an operation of the user at least includes the event participation managing section 11, the initial level setting section 12, the level-up determining section 13, the privilege giving section 14, and the clear reward giving section 15. Thus, the clear reward giving section 15 gives the point for raising the level of the player character out of the event to the player character, which participates in the event, of the user for which the level of the player character out of the event does not reach the upper limit in a case where the predetermined condition to clear the event, which is set to the event, is satisfied. Therefore, since the player character with the low level out of the event of the user can obtain the experience value at the time to clear the event to raise the level of the player character, such a user is motivated to participate in the event. Further, the item that can be used in the video game is given to the user for whom the level of the player character out of the event has already reached the upper limit. Thus, even in a case where the level of the player character out of the event has already reached the upper limit, such a user is motivated to participate in the event because the user can obtain the item. Namely, it is possible to provide an event by which there is a merit for both a beginner and an expert (who is a person with advanced skills) of the video game.

Third Embodiment

In each of the first and second embodiments, the case where the level-up determining section 13 determines whether the level of the player character is to be raised or not has been described. However, details to determination of whether the level is to be raised or not has not been mentioned therein. As a method of determining whether the level is to be raised or not, for example, the following method is thought. In this method, a table in which a relationship between a level and an experience value required to reach the level is stored in advance is provided, and it is determined whether the level is to be raised or not by referring to the table when to obtain an experience value.

In each of the first and second embodiments, it is need to determine whether each of a level of a player character out of an event and a level of the player character in the event is to be raised or not and to manage the level of the player character. At this time, an experience value table used in the event may be different from an experience value table used out of the event. In order to configure a video game so that the level of the player character is caused to be raised at a good tempo during a short-time event and the video game proceeds, an experience value table dedicated to the inside of the event for raising the level in a short time is provided. By adopting such an experience value table dedicated to the inside of the event, the video game proceeds while causing the player character to grow at an intended tempo even in a special event in which the level of the player character starts from an initial level. Therefore, it becomes possible to cause the video game to proceed without boring the user.

Fourth Embodiment

In each of the first and second embodiments, the case where the level-up determining section 13 determines the level of the player character is raised has been described. However, at this time, the server 10 may be configured so as to: refer to a skill table in which a level of a player character is associated with a skill that the player character is allowed to learn; and determine whether the player character is to be allowed to learn the skill at the same time. By configuring the server 10 in this manner, it is possible to determine whether to learn the skill or not by the level-up determining section 13. In any of the first and second embodiments, details of the skill table used in the event has not been mentioned.

Here, the skill table used in an event is a skill table in which a relationship between a level of a player character out of the event and a skill that the player character is allowed to learn is defined, and is also in common used in the event. In a case where the level-up determining section 13 determines that the level of the player character reaches a level to allow to learn the skill (hereinafter, referred to as a "skill learning level", the player character is caused to learn the skill. Therefore, by in common using the skill table for out of the event in the event, the user is allowed to participate in the event without feeling uncomfortable about at what level and which skill is learned.

Fifth Embodiment

In the fourth embodiment, the common skill table is adopted in or out of the event, and the player character is caused to learn the skill in a case where the level of the player character reaches the level allowed to learn the skill in the event. In a case where anything is not limited, the player character can learn a skill that the player character does not learn out of the event when to reach the level in the event.

Thus, with respect to the skill that the player character does not learn out of the event, a video game processing system 100 according to the present embodiment may be configured so as to limit the skill that the player character cannot learn even though the level of the player character reaches the level allowed to learn the skill in the event. More specifically, a skill table, in which the level of the player character out of the event is associated with a skill that the player character is allowed to learn, is in common used in the event. In addition, even though the level-up determining section 13 determines that the level of the player character reaches a skill learning level, the privilege giving section 14 causes the player character to learn the skill in the event as the privilege only in a case where the level of the player character in the event reaches a level that the player character has already reached out of the event and is the level allowed to learn the skill. Thus, by allowing the player character to learn only the skill, which has been learned out of the event, in the event, it becomes possible to give a fixed advantage to the expert. Therefore, there is an effect that it is possible to maintain motivation of the user because labor of the user out of the event does not become a waste.

Sixth Embodiment

In each of the first to fifth embodiments, the case where the event starts from the initial level regardless of the level of the player character, which participates in the event, out of the event has been described. However, in the present embodiment, the more concrete content of the event will be described.

Figure 8:
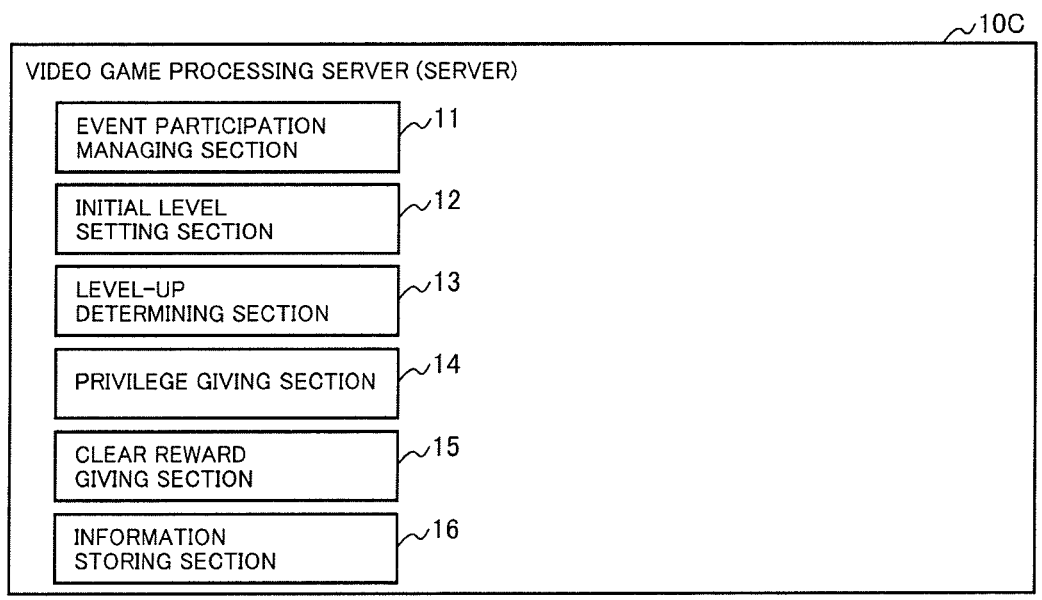
FIG. 8 is a block diagram showing a configuration of the server corresponding to at least one of the embodiments according to the present invention.

FIG. 8 is a block diagram showing a configuration of a video game processing server 10C (hereinafter, referred to as a "server 10C"), which is an example of the configuration of the server 10. As shown in FIG. 8, the server 10C at least includes an event participation managing section 11, an initial level setting section 12, a level-up determining section 13, a privilege giving section 14, a clear reward giving section 15, and an information storing section 16. Explanation of a sixth embodiment will be made on the basis of FIG. 8.

The information storing section 16 has a function to store various kinds of information. As information that is to be stored in the information storing section 16, there are at least status information containing a level of a player character out of an event and the like, status information containing a level of the player character in the event and the like, information on an experience value table, and information on a skill table in addition to various kinds of information necessary for controlling progress of the video game. It is need to store the information described above in order to save and store the event in a middle (half-way) state. The information may be stored in the server 10A. Alternatively, the information may be configured so as to be stored in each of the user terminals 20, 201 to 20N. In this regard, it goes without saying that necessary information is appropriately stored in any storing section regardless of presence or absence of description in all of the embodiments described above and below.

Further, a processing procedure is appropriately transmitted to the user terminal 20 in procedures carried out in the game processing. At the user terminal 20 side, a display device is caused to display a game screen based on the content of the received processing procedure on a display screen. In this regard, generation of a game screen may be carried out at the server 10C side, or carried out at the user terminal 20 side.

Here, the game screen means a screen representing a virtual space (or a game space). In this regard, in the present embodiment, various kinds of elements constituting the game screen may be called as an image. A configuration of the game screen is not limited particularly so long as it is a configuration in which the user can recognize a status of the video game.

Further, the phrase "display the game screen on the display screen of the display device" means that the game screen is outputted onto the display device included in the user terminal 20 or the like by means of communication using the communication network 30. As an example of a configuration to cause the display device to display the game screen, there is a configuration in which information generated at the server side (that is, output information) is transmitted to the terminal side. In this regard, a configuration of the output information is not limited particularly. For example, it may be information in which an image is compressed, or information for causing the terminal side to generate an image. As an example of the information in which the image is compressed, there is one used in a cloud game (for example, MPEG). Further, as information for generating an image at the terminal side, there is one used in an online game (for example, positional information of an object).

A level, which increases on the basis of a point for raising the level, that is, a so-called experience value, is set to player character for out of the event. The experience value is obtained by a battle against an enemy character or the like. Various parameters by which strength of the player character is determined increase as the level thereof increases. In addition, the number of skills to be used (such as a special ability each of which can be used during a battle against an enemy character or during movement in a field, by which the user can cause the video game to proceed advantageously) increases. For this reason, the player character increases strength thereof in accordance with the level of the player character. However, the event is an event in which levels of all of the player characters are set to the same predetermined initial level (for example, Level 1) and is caused to start from the predetermined initial level. Therefore, the special event becomes an event in which even though the levels of the player characters are quite different from each other, the player characters basically start the event under the same condition.

In order to start the event, it is need to form a party that includes at least one player character. In a case where a plurality of player characters of a plurality of users form a party, the video game processing system 100 may be configured so that the plurality of users forms a group in advance and the player characters in the group are allowed to participate in the event. Alternatively, the video game processing system 100 may be configured so as to carry out a matching process, in which the prescribed number of player characters each of which participates in the event alone is combined when to receive participation in the event, to form a party in which the plurality of player characters is included.

In the matching process, a matching condition when to form a party may be set appropriately. For example, a condition that duplication of a kind of occupation (that is, a job) of one player character that participates in the event and that of the other player character is denied may be imposed. Further, as a method of matching, it may be matching completely at random, or matching in which a leader of each party recruits a member thereof and a participant is allowed to select a desired party.

This event that starts from the predetermined initial level is set so that the player character goes down floors deep under the ground of a dungeon, for example. The player character obtains an experience value by winning a battle against an enemy character in the middle of going down the floors, and the level of the player character is raised by the experience value to go down while strengthening the player character.

When the level-up determining section 13 determines whether the level is to be raised or not, a table indicating a relationship between the experience value and the level (that is, the experience value table) is provided in advance, and the level-up determining section 13 refers to the table whenever an experience value is obtained and determines whether the level reaches an experience value to raise the level or not. Further, a table indicating a relationship between a level and a skill (skill table) is also provided in advance, and the level-up determining section 13 determines whether a skill to be learned exists or not at the timing to raise the level.

Next, in a case where the level-up determining section 13 determines that the level of the player character is raised, the privilege giving section 14 determines whether a newly reached level is a predetermined level or not. The predetermined level is a level that the player character has already reached out of the event. The predetermined level mentioned herein is a level at which it is defined in advance to give a privilege to the user or the player character.

As examples of the privilege, there are various privilege such as learning of a special skill that cannot be learned by merely raising the level of the player character, giving of an item that can be used in an event, and giving of a currency that can be used in the video game, for example. Further, as a condition required to be satisfied out of the event, the video game processing system 100 may be configured to as to require not only a condition of a reached level but also satisfaction of a special condition other than the conditions regarding the level. As one example of the special condition, there are a condition that all of a plurality of tasks (or quests) is cleared out of the event, and the like.

For example, in a case where there is a skill that can be learned when all of the plurality of tasks (or quests) are cleared out of the event, it is determined whether the plurality of tasks (or quests) is cleared out of the event or not at the stage that the level of the player character reaches the level at which the skill can be learned in the event. The video game processing system 100 may be configured so as to give the skill to the player character as a privilege in the event only in a case where all of the tasks is cleared.

In a case where the condition is satisfied, the privilege is given to the player character in this manner and the video game proceeds. In a case where a condition to clear the video game is satisfied, the clear reward giving section 15 gives the clear reward to the player character. As examples of the clear reward, for example, it is thought that an experience value is given to the player character whose level out of the event does not reach an upper limit thereof as the clear reward, and an item, which can be used in the video game, is given to the player character whose level out of the event reaches the upper limit thereof.

In this regard, in a case where the floors of a dungeon in such an event are set to very deep floors, it takes a long time restricted to capture and clear the dungeon by the same party at one time. For this reason, for example, the video game processing system 100 may be configured so that a configuration of a current party and a strength status such as a level of each of the player characters can be stored whenever the player characters go down ten floors. By configuring the video game processing system 100 in this manner, it becomes possible to play the video game by separating the video game at every ten floors.

In a case where a status to play the event is stored at every ten floors, it is thought that the users are allowed to resume and play the video game next time when all of the participants (that is, the users) constituting the party become complete. However, in such a configuration, it is difficult for the participants to continue the event. For this reason, the video game processing system 100 may be configured so that even in a case where all of the participants constituting the party does not become complete, any participant is allowed to form a party with another user in a form that information on the reached floor and information on the strength status of equipment (will be described later) are taken over and to resume and play the event from the last interruption. In order to realize this configuration, it is need to provide a system in which matching with other participant having the same condition is carried out while taking over a status of stored data.

Further, in the MMORPG, a concept of so-called equipment, such as a weapon, a protective guard, and an accessory, is introduced as an element to reinforce the status of the player character. However, in this event, an effect of equipment out of the event is not demonstrated (the effect thereof may remain for appearance of the player character), and equipment that the player character is allowed to use only in the event is used. Further, the player character causes the event to proceed while strengthening equipment dedicated to the inside of the event in this event. Moreover, a parameter is provided for the equipment. The equipment is configured so that the higher a numerical value of the parameter is, the stronger the equipment becomes. The numerical value of the parameter increases by strengthening the equipment.

The player character is allowed to take over a strengthening state of this equipment dedicated to the inside of the event and use it when to repeatedly paly the event many times over. By configuring the equipment in this manner, it is provided a relief element to a user who cannot achieve the condition to clear the event. In a case where the player character cannot clear the event and challenges the event from the beginning thereof again, the level of the player character is set to the initial level. However, the player character is allowed to take over the strengthening state of the equipment and play the event. As a method of strengthening the equipment, for example, a lottery for strengthen the equipment is carried out by opening a special treasure box. When the lottery is won, the strength of the equipment is carried out. Namely, a phenomenon may occur that a player character whose equipment succeeds to be strengthened and a player character whose equipment fails to be strengthened are included in the same party.

Moreover, a system in which the numerical value of the parameter of the equipment can be exchanged into a special coin in the video game may be introduced. In a status that the numerical value of the parameter of the equipment of the player character that participates in the event plural times reaches the upper limit thereof or a status that the numerical value is near the upper limit, the player character obtains the special coin in the video game in place of reduction of the numerical value of the parameter of the equipment when the player character is scheduled to further participate in the event. By providing an item or the like that cannot be exchanged only by this special coin in the video game, there is an effect to function as a speedrun element for an expert for whom a level of a player character reaches the upper limit thereof out of the event.

Further, in a case where a play status of the event can be stored for every ten floors, for example, the point that the system in which the matching with a user different from any party member at a previous play time while taking over a status of stored data at the previous play time may be provided when to resume and play the event next time has been described. However, in a case where it is an essential condition to be the same floor, there is a fear that a status that the event cannot start for a long, long time because the user cannot find a partner for matching. Therefore, in a method of matching a party in order to play the event from the last interruption in the stored data, the matching may be carried out to form a party even though the player characters are not necessarily in the same condition.

For example, in a case where the matching is utilized in order to play the event from the last interruption in the stored data that were stored after the player characters proceed to a 20th basement floor, only a user who has the stored data in which the player character of the user proceeds to the 20th basement floor is not necessarily a matching candidate, but a user who has information in which the player character proceeds to a different floor may also be contained as the matching candidate.

However, in the event that starts after the level of the player character is set to the initial level, in a case where the player character is allowed to participate in the event from a specific floor suddenly by skipping the intermediate floors in the initial level, a situation that the player character cannot become military strength may occur because the level of the player character in the event is too low. For this reason, in a case where the player character is allowed to participate in the event from the intermediate floor, the player character does not start the event from the initial level, but the player character may be allowed to participate in the event after the level of the player character is set to a predetermined level that is linked to the floor in which the player character participates.

Similarly, with respect to the strengthening state of the equipment dedicated to the inside of the event as described above, a situation that the player character cannot become a military strength may occur due to a status in which the player character is not strengthened at all. For this reason, in a case where the player character is allowed to participate in the event from the intermediate floor, the event is to be started after the strengthening state of the equipment dedicated to the inside of the event is set to a predetermined strengthening state that is linked to the floor in which the player character participates. In this regard, in a case where a process to raise the equipment dedicated to the inside of the event to the predetermined strengthening state is carried out in this manner, handling after termination of the event becomes a problem. However, for example, in a case where strengthening of the equipment dedicated to the inside of the event is carried out while playing in the event, it is thought a process to add a portion that is strengthened when to participate in the event in the middle thereof to the original strengthening state of the equipment dedicated to the inside of the event for the player character.

Further, with respect to the strengthening state of the equipment dedicated to the inside of the event, in a case where the strengthening state is taken over and allowed to be used when to repeatedly play the event many times, the player character with a state that the strengthening state of the equipment is quite strengthened exists. Thus, as a condition that the player character with a low level is set to a matching candidate to participate in the event in the middle, it may be a condition that the strengthening state of the equipment is strengthened to a predetermined state.

As described above, the player character with stored data of a different progress status is allowed to become matching, and the level of the player character with a low progress status and the equipment thereof are respectively set to the predetermined level and a strengthening state of predetermined equipment, which are linked to the floor at which the event is resumed and played, at that time to resume and play the event. This solves a problem caused by a difference of growth statuses (that is, the progress statuses) of the player characters in a case where the player characters each having a different progress status forms a party to cause the event to proceed. Therefore, it is possible to cause the event to proceed without applying stress to both of the users.

Further, for example, the video game processing system 100 may be configured so that the event is set to a labyrinth of deaths and an NPC (that is, a non-player character), which seems to appear in a story out of the event and die, reappears as an enemy character. By causing a character, which appears in a main story and dies, to reappear, there is an effect that the user is caused to feel that the event is an event relevant to the main story.

Seventh Embodiment

In each of the first to sixth embodiments, the explanation thereof has been made on the basis of a premise that growth of the player character is managed in accordance with the level thereof. However, the growth of the player character is not necessarily limited to the case where the player character grows in accordance with the level thereof. For example, it is thought a system for growth in which each of parameters expressing strength of the player character increases at random in accordance with a probability. Namely, it may be thought a video game in which strength of the player character changes on the basis of a certain growth system.

In this case, the initial level setting section 12 according to each of the first to sixth embodiments is replaced by a growth state setting section. The growth state setting section sets growth states of player characters each of which has a different growth state out of the event (that is, a value of a parameter indicating strength thereof is different from that of other player character) to the same growth state (that is, set the parameter indicating strength thereof to the same value), and cause the event to start. As one example of the growth state, a state of strength of the player character, which is expressed by a parameter value, is expressed as the growth state. However, as growth of the player character, an increase in the number of skills that can be used, an increase in possessed items, and the like are included. For this reason, even such cases are included in the expression "growth state of the player character".

Similarly, the level-up determining section 13 according to each of the first to sixth embodiments is replaced by a determining section. The determining section determines and extracts timing when a change in the value of the parameter indicating strength of the player character occurs. In a case where the growth state is to be set using elements other than growth determination by the parameter value, the determining section also determines timing of growth of the player character, such as timing to learn a skill, timing to obtain an item, and the like.

Similarly, in the privilege giving section 14 according to each of the first to sixth embodiments, the condition that the level of the player character reaches the predetermined level is one of the conditions to give the privilege to the player character. However, a privilege giving section according to the present embodiment gives a privilege to the player character in an event in a case where a parameter value indicating strength of the player character in the event reaches a predetermined parameter value, which is a parameter value that the player character has already reached out of the event. As an example other than the case where the growth state is managed by the parameter value, the privilege giving section according to the present embodiment may give a privilege to the player character in a case where a condition of a learned skill or a possessed item satisfies a predetermined condition that is a condition that the player character has already reached the growth state out of the event.

As described above, by replacing a part of components according to each of the first to sixth embodiments to components that has been described in the present embodiment, in a video game in which the growth state of the player character changes on the basis of the certain growth system, the growth state setting section can set those of the player characters to the same growth state to cause the event to start; and the determining section can determines timing to give a privilege to the player character using the growth state.

APPENDIX

The explanation of the embodiments described above has been described so that the following inventions can be at least realized by a person having a normal skill in the art to which the present invention belongs.

(1)

A non-transitory computer-readable medium including a video game processing program product for causing a server to realize functions to control progress of a video game in response to an operation of a user, wherein the functions include:

an event participation managing function configured to receive participation in an event from at least one of users in the video game to constitute and manage a party, the at least one of the users being allowed to participate in the event;

an initial level setting function configured to set a level of a player character in the event to a predetermined initial level regardless of a level of the player character indicating a degree of strength outside the event of the player character of the user who participates in the event, the initial level setting function being configured to cause the event to start after the level of the player character in the event is set to the predetermined initial level;

a level-up determining function configured to manage a predetermined condition to raise the level of the player character in the event, the level-up determining function being configured to determine whether the player character satisfies the predetermined condition or not; and a privilege giving function configured to give a privilege in the event to the player character or the user in a case where the level of the player character in the event reaches a predetermined level, the predetermined level being a level that the player character has already reached out of the event.

(2)

The non-transitory computer-readable medium according to claim (1), wherein the functions further include:

a point giving function configured to give a point for raising a level of a player character out of the event to a player character, which participates in the event, of a user of whom a level of the player character out of the event does not reach an upper limit in a case where a predetermined condition to clear the event is satisfied, the predetermined condition being set to the event.

(3)

The non-transitory computer-readable medium according to claim (1) or (2), wherein the functions further include:

an item giving function configured to give an item to a player character of a user, whose level out of the event reaches an upper limit in a case where a predetermined condition to clear the event is satisfied, the predetermined condition being set to the event, the item being usable in the video game.

(4)

The non-transitory computer-readable medium according to any one of claims (1) to (3), wherein a condition of a point for raising the level of the player character in the event is differentiated from a condition of a point for raising the level of the player character out of the event.

(5)

The non-transitory computer-readable medium according to any one of claims (1) to (4), wherein a skill table, in which the level of the player character out of the event is associated with a skill that the player character is allowed to learn, is in common used in the event, and wherein the privilege giving function includes a function configured to cause the player character to learn a skill in a case where it is determined that the level of the player character reaches a level to allow the player character to learn the skill.

(6)

The non-transitory computer-readable medium according to any one of claims (1) to (4), wherein a skill table, in which the level of the player character out of the event is associated with a skill that the player character is allowed to learn, is in common used in the event, and wherein the privilege giving function includes a function configured to cause, even though it is determined that the level of the player character reaches a level to allow the player character to learn a skill in the level-up determining function, the player character to learn a skill in the event as the privilege only in a case where the level of the player character in the event reaches a level that the player character has already reached out of the event and is a level at which the player character is allowed to learn the skill.

(7)

A non-transitory computer-readable medium including a video game processing program for causing a user terminal to realize at least one function of the functions that the video game processing program product described in any one of claims (1) to (6) causes the server to realize, the server being capable of communicating with the user terminal.

(8)

A server into which the video game processing program product included in the non-transitory computer-readable medium according to any one of claims (1) to (7) is installed.

(9)

A non-transitory computer-readable medium including a video game processing program product for causing a user terminal to realize functions to control progress of a video game in response to an operation inputted in the user terminal by a user, wherein a server includes:

an event participation managing function configured to receive participation in an event from at least one of users in the video game to constitute and manage a party, the at least one of the users being allowed to participate in the event;

an initial level setting function configured to set a level of a player character in the event to a predetermined initial level regardless of a level of the player character indicating a degree of strength outside the event of the player character of the user who participates in the event, the initial level setting function being configured to cause the event to start after the level of the player character in the event is set to the predetermined initial level;

a level-up determining function configured to manage a predetermined condition to raise the level of the player character in the event, the level-up determining function being configured to determine whether the player character satisfies the predetermined condition or not; and a privilege giving function configured to give a privilege in the event to the player character or the user in a case where the level of the player character in the event reaches a predetermined level, the predetermined level being a level that the player character has already reached out of the event, and wherein the functions include:

a receiving function configured to receive information regarding the functions included in the server; and an inputting/outputting function configured to carry out an input and output corresponding to the functions included in the server.

(10)

A non-transitory computer-readable medium including a video game processing program product for causing a user terminal to realize functions to control progress of a video game in response to an operation of a user, wherein the functions include:

an event participation managing function configured to receive participation in an event from at least one of users in the video game to constitute and manage a party, the at least one of the users being allowed to participate in the event;

an initial level setting function configured to set a level of a player character in the event to a predetermined initial level regardless of a level of the player character indicating a degree of strength outside the event of the player character of the user who participates in the event, the initial level setting function being configured to cause the event to start after the level of the player character in the event is set to the predetermined initial level;

a level-up determining function configured to manage a predetermined condition to raise the level of the player character in the event, the level-up determining function being configured to determine whether the player character satisfies the predetermined condition or not; and a privilege giving function configured to give a privilege in the event to the player character or the user in a case where the level of the player character in the event reaches a predetermined level, the predetermined level being a level that the player character has already reached out of the event.

(11)

A non-transitory computer-readable medium including a video game processing program for causing a server to realize at least one function of the functions that the video game processing program product described in claim 10) causes the user terminal to realize, the server being capable of communicating with the user terminal.

(12)

A user terminal into which the video game processing program product included in the non-transitory computer-readable medium according to any one of claims (9) to (11) is installed.

(13)

A video game processing system for controlling progress of a video game in response to an operation of a user, the video game processing system including a communication network, a server, and a user terminal, the video game processing system comprising:

an event participation managing section configured to receive participation in an event from at least one of users in the video game to constitute and manage a party, the at least one of the users being allowed to participate in the event;

an initial level setting section configured to set a level of a player character in the event to a predetermined initial level regardless of a level of the player character indicating a degree of strength outside the event of the player character of the user who participates in the event, the initial level setting function being configured to cause the event to start after the level of the player character in the event is set to the predetermined initial level;

a level-up determining section configured to manage a predetermined condition to raise the level of the player character in the event, the level-up determining function being configured to determine whether the player character satisfies the predetermined condition or not; and a privilege giving section configured to give a privilege in the event to the player character or the user in a case where the level of the player character in the event reaches a predetermined level, the predetermined level being a level that the player character has already reached out of the event.

(14)

The video game processing system according to claim 13), wherein the server includes the event participation managing section, the initial level setting section, the level-up determining section, and the privilege giving section, and wherein the user terminal includes:

a transmitting/receiving section configured to transmit and receive information regarding the video game; and an outputting section configured to output a game screen on a display screen of a display device.

(15)

A video game processing method of controlling progress of a video game in response to an operation of a user, the video game processing method comprising:

an event participation managing process configured to receive participation in an event from at least one of users in the video game to constitute and manage a party, the at least one of the users being allowed to participate in the event;

an initial level setting process configured to set a level of a player character in the event to a predetermined initial level regardless of a level of the player character indicating a degree of strength outside the event of the player character of the user who participates in the event, the initial level setting function being configured to cause the event to start after the level of the player character in the event is set to the predetermined initial level;

a level-up determining process configured to manage a predetermined condition to raise the level of the player character in the event, the level-up determining function being configured to determine whether the player character satisfies the predetermined condition or not; and a privilege giving process configured to give a privilege in the event to the player character or the user in a case where the level of the player character in the event reaches a predetermined level, the predetermined level being a level that the player character has already reached out of the event.

(16)

A video game processing method of controlling progress of a video game in response to an operation of a user, the video game processing method being executed by a video game processing system, the video game processing system comprising a communication network, a server, and a user terminal, the video game processing method comprising:

an event participation managing process configured to receive participation in an event from at least one of users in the video game to constitute and manage a party, the at least one of the users being allowed to participate in the event;

an initial level setting process configured to set a level of a player character in the event to a predetermined initial level regardless of a level of the player character indicating a degree of strength outside the event of the player character of the user who participates in the event, the initial level setting function being configured to cause the event to start after the level of the player character in the event is set to the predetermined initial level;

a level-up determining process configured to manage a predetermined condition to raise the level of the player character in the event, the level-up determining function being configured to determine whether the player character satisfies the predetermined condition or not; and a privilege giving process configured to give a privilege in the event to the player character or the user in a case where the level of the player character in the event reaches a predetermined level, the predetermined level being a level that the player character has already reached out of the event.

(17)

A non-transitory computer-readable medium including a video game processing program product for causing a server to realize functions to control progress of a video game in response to an operation of a user, wherein the functions include:

an event participation managing function configured to receive participation in an event from at least one of users in the video game to constitute and manage a party, the at least one of the users being allowed to participate in the event;

a growth state setting function configured to set a growth state of a player character in the event to a predetermined growth state regardless of a growth state out of the event of the player character of the user who participates in the event, the growth state setting function being configured to cause the event to start after the growth state of the player character is set to the predetermined growth state;

a growth determining function configured to manage the growth state of the player character in the event, the determining function being configured to determine whether the player character is grown or not; and a privilege giving function configured to give a privilege in the event to the player character or the user in a case where the growth state of the player character in the event reaches a predetermined growth state, the predetermined growth state being a growth state that the player character has already reached out of the event.

According to one of the embodiments of the present invention, it is useful to attract interest of a user in a video game.

What is claimed is:

1. A non-transitory computer-readable medium including a video game processing program product configured to cause a server to control functions of a video game in response to an operation of a user, wherein the functions include:

an event participation managing function configured to receive participation in an event from at least one of users in the video game to constitute and manage a party, the at least one of the users being allowed to participate in the event via a player character;

an initial level setting function configured to set a level of the player character in the event to a predetermined initial level, the player character in the event being set to the predetermined initial level regardless of the level of the player character outside the event, and the initial level setting function being configured to cause the event to start after the level of the player character in the event is set to the predetermined initial level; and a level-up determining function configured to manage a predetermined condition to raise the level of the player character in the event after being set to the predetermined initial level, the level-up determining function being configured to determine whether the player character satisfies the predetermined condition or not, wherein a job of the player character while the user of the player character participates in the event corresponds with a job of the player character outside of the event, wherein the functions further include:

a point giving function configured to give a point for raising a level outside of the event to the player character, which participates in the event, and wherein the level of the player character out of the event does not reach an upper limit when the predetermined condition is satisfied, and the predetermined condition is to clear the event.

2. The non-transitory computer-readable medium according to claim 1, wherein, in a case where at least one of a first user of a first player character or a second user of a second player character participates in the event from outside of the event, appearance of the at least one of the first player character or the second player character remains after participation of the event.

3. The non-transitory computer-readable medium according to claim 1, wherein a condition of a point for raising a level of at least one of a first player character or a second player character in the event is differentiated from a condition of a point for raising the level of the at least one of the first player character or the second player character out of the event.

4. The non-transitory computer-readable medium according to claim 1, wherein a skill table, in which a level of at least one of a first player character or a second player character out of the event is associated with a skill that the at least one of the first player character or the second player character is allowed to learn, is in common and used in the event, and wherein the privilege giving function includes a function configured to cause the at least one of the first player character or the second player character to learn a skill in a case where it is determined that the level of the at least one of the first player character or the second player character reaches a predetermined level to allow the at least one of the first player character or the second player character to learn the skill.

5. The non-transitory computer-readable medium according to claim 1, wherein a skill table, in which a level of at least one of a first player character or a second player character out of the event is associated with a skill that the at least one of the first player character or the second player character is allowed to learn, is in common and used in the event, and wherein the privilege giving function includes a function configured to cause, even though it is determined that the level of the at least one of the first player character or the second player character reaches a predetermined level to allow the at least one of the first player character or the second player character to learn a skill in the level-up determining function, the at least one of the first player character or the second player character to learn a skill in the event as the privilege only in a case where the level of the at least one of the first player character or the second player character in the event reaches a level that the at least one of the first player character or the second player character has already reached out of the event and is at a level at which the at least one of the first player character or the second player character is allowed to learn the skill.

6. The non-transitory computer-readable medium according to claim 1, wherein a first user utilizes a first computing device to participate in the event and a second user utilizes a second computing device to participate in the event.

7. The non-transitory computer-readable medium according to claim 6, wherein the first computing device and the second computing device participate in the event via the network.

8. The non-transitory computer-readable medium according to claim 1, wherein the event is initiated based on triggering an event participation flag.

9. The non-transitory computer-readable medium according to claim 8, wherein the event participation flag is set based on an input operation carried out by at least one of a first user or a second user.

10. The non-transitory computer-readable medium according to claim 1, wherein the event is initiated after a party is formed by a plurality of users.

11. A non-transitory computer-readable medium including a video game processing program product configured to cause a server to control functions of a video game in response to an operation of a user, wherein the functions include:

an event participation managing function configured to receive participation in an event from at least one of users in the video game to constitute and manage a party, the at least one of the users being allowed to participate in the event via a player character;

an initial level setting function configured to set a level of the player character in the event to a predetermined initial level, the player character in the event being set to the predetermined initial level regardless of the level of the player character outside the event, and the initial level setting function being configured to cause the event to start after the level of the player character in the event is set to the predetermined initial level; and a level-up determining function configured to manage a predetermined condition to raise the level of the player character in the event after being set to the predetermined initial level, the level-up determining function being configured to determine whether the player character satisfies the predetermined condition or not, wherein a job of the player character while the user of the player character participates in the event corresponds with a job of the player character outside of the event, wherein the functions further include:

an item giving function configured to give an item to the player character, wherein the level of the player character outside of the event reaches an upper limit when the predetermined condition is satisfied, and the predetermined condition is to clear the event, and wherein the item is usable in the video game.

12. The non-transitory computer-readable medium according to claim 11, wherein, in a case where at least one of a first user of a first player character or a second user of a second player character participates in the event from outside of the event, an appearance of the at least one of the first player character or the second player character remains after participation of the event.

13. The non-transitory computer-readable medium according to claim 11, wherein a condition of a point for raising a level of at least one of a first player character or a second player character in the event is differentiated from a condition of a point for raising the level of the at least one of the first player character or the second player character out of the event.

14. The non-transitory computer-readable medium according to claim 11, wherein a skill table, in which a level of at least one of a first player character or a second player character out of the event is associated with a skill that the at least one of the first player character or the second player character is allowed to learn, is in common and used in the event, and wherein the privilege giving function includes a function configured to cause the at least one of the first player character or the second player character to learn a skill in a case where it is determined that the level of the at least one of the first player character or the second player character reaches a predetermined level to allow the at least one of the first player character or the second player character to learn the skill.

15. The non-transitory computer-readable medium according to claim 11, wherein a skill table, in which a level of at least one of a first player character or a second player character out of the event is associated with a skill that the at least one of the first player character or the second player character is allowed to learn, is in common and used in the event, and wherein the privilege giving function includes a function configured to cause, even though it is determined that the level of the at least one of the first player character or the second player character reaches a predetermined level to allow the at least one of the first player character or the second player character to learn a skill in the level-up determining function, the at least one of the first player character or the second player character to learn a skill in the event as the privilege only in a case where the level of the at least one of the first player character or the second player character in the event reaches a level that the at least one of the first player character or the second player character has already reached out of the event and is at a level at which the at least one of the first player character or the second player character is allowed to learn the skill.

\* \* \* \* \*